United States Patent [19]
Robinson et al.

[11] Patent Number: 6,122,291
[45] Date of Patent: Sep. 19, 2000

[54] COMMUNICATION SYSTEM AND OPERATING METHOD THEREOF

[75] Inventors: William Neil Robinson, Saint Nom la Breteche, France; Paul Crichton, Newbury, United Kingdom; Howard Peter Benn, Swindon, United Kingdom; David Chambers, Bath, United Kingdom

[73] Assignee: Motorola, Inc., Schaumburg, Ill.

[21] Appl. No.: 08/945,618

[22] PCT Filed: Feb. 27, 1997

[86] PCT No.: PCT/EP97/00945

§ 371 Date: Dec. 22, 1997

§ 102(e) Date: Dec. 22, 1997

[87] PCT Pub. No.: WO97/33393

PCT Pub. Date: Sep. 12, 1997

[30] Foreign Application Priority Data

Mar. 7, 1996 [GB] United Kingdom .................... 9604822

[51] Int. Cl.[7] .................................. H04J 3/16; H04J 3/22
[52] U.S. Cl. .......................... 370/468; 370/329; 455/452
[58] Field of Search ..................................... 370/328, 329, 370/330, 331, 341, 461, 465, 448, 431, 468; 455/422, 450, 451, 452, 454

[56] References Cited

U.S. PATENT DOCUMENTS

| | | | |
|---|---|---|---|
| 5,231,649 | 7/1993 | Duncanson | 375/260 |
| 5,463,620 | 10/1995 | Sriram | 370/412 |
| 5,638,363 | 6/1997 | Gittins et al. | 370/358 |
| 5,818,830 | 10/1998 | Daane et al. | 370/347 |

Primary Examiner—Ajit Patel
Assistant Examiner—Bob A. Phunkulh
Attorney, Agent, or Firm—Mario J. Donato, Jr.

[57] ABSTRACT

A communication system (28), comprises a master device (44) and slave device (30). Consequential to negotiations within the system (28) and having regard to system capacity and a relative hierarchy that exists between on-going communications, a bandwidth used for an on-going communication between the master device (44) and the slave device (30) is modified in proportion to a substantially instantaneous data rate requirement of the communication. As such, the system allows fluctuations in the amount of information, transmitted in a fixed time through an optimization of an available and dynamically varying bandwidth, while biasing the communication resource in relation to the relative hierarchy.

16 Claims, 4 Drawing Sheets

-PRIOR ART-

COMMUNICATION SYSTEM AND OPERATING METHOD THEREOF

BACKGROUND TO THE INVENTION

This invention relates, in general, to communication systems and is particularly applicable to an allocation of bandwidth for reception or transmission of information over a communication resource of such a communication system.

SUMMARY OF THE PRIOR ART

Competition and a limited availability of spectrum creates pressure on manufacturers, service providers and operators to maximise the spectrum efficiency of communications systems, generally, and particularly in relation to wireless telecommunication systems. In this respect, variable rate voice-coders (vocoders), such as implemented in the IS-95 Code Division Multiple Access (CDMA) system, provide a method of increasing spectrum efficiency. Furthermore, with specific regard to wireless systems, it is also desirable for these systems to adapt to changing system loads without the need to depart from simple frequency planning schemes. Indeed, it would be beneficial to adapt cellular frequency reuse plans, rather than to be burdened with the inflexibility of a fixed system design that has been carefully balanced by the manufacturer to take account of worst case interference problems (which may not always occur at any given point in time) for each deployment scenario.

With the move towards providing more services, such as data and multimedia, to users of wireless telecommunications networks, the use of variable information transfer rates (i.e. variable instantaneous bit rates) is becoming prevalent.

For example, in Time Division Multiplexed (TDM) systems, such as the Digital European Cordless Telephone (DECT) standard and the Global System for Mobile (GSM) cellular communication, different bit rates may be accommodated in the time-domain by using integer multiple (contiguous) slots to support the selected bit rate. Indeed, in DECT (which is a Time Division Duplex (TDD) system) it has been proposed that slots normally allocated to a reverse channel can be re-allocated to the forward channel, thereby providing an asymmetric data service. As such, transmission of more information on a fixed frequency channel in a constant power envelope system requires a greater transmission period.

Other TDM systems accommodate differing data rates by changing to different levels of modulation (such as Binary Phase-Shift Keying (BPSK), Quadrature, Phase-Shift Keying (QPSK) and forms of Quadrature Amplitude Modulation (QAM), e.g. 16-QAM and 64-QAM), whereby varying numbers of bits of information are encoded in each symbol transmitted.

Alternatively, CDMA systems support different data rates by adjusting the transmission power and, in some instances, by entering a discontinuous transmission mode. As will be understood, CDMA systems operate with a constant power spectral density in which there is an approximately constant energy per bit, so the transmission of fewer bits, in general, has the effect of reducing overall power transmission.

Consequently, by using existing techniques only, each operator or service provider wishing to offer high data rate services will require the allocation of a large amount of spectrum in each coverage area (cell) served. Therefore, a technique which would enable operators or service providers to use less spectrum without diminishing their ability to offer high data rate services would be most advantageous.

SUMMARY OF THE INVENTION

According to a first aspect of the present invention there is provided a communication system having a communication resource for supporting communications on a plurality of channels having channel bandwidths, the plurality of channels capable of supporting a plurality of differing services, the system comprising: means for determining a demand on the communication resource; and means for dynamically modifying a bandwidth of at least one channel of the plurality of channels in response to the demand, said means for dynamically modifying being arranged to modify the bandwidth to bias the communication resource with respect to a relative hierarchy that exists between on-going communications.

Memory may store hierarchy information defining a relative hierarchy within communication devices of the communication system, wherein the means for dynamically modifying the bandwidth modifies the bandwidth of at least one channel to bias the communication resource to support an operating capability of a first communication device having a hierarchy relatively high to that of a second communication device having a relatively lower hierarchy in the communication system.

The relative hierarchy may exist between differing services supported by the communication system.

In a second aspect of the present invention there is provided a method for distributing a communication resource of a communication system into a plurality of channels, the method comprising the steps of: determining a demand on the communication resource; dynamically modifying a bandwidth of at least one channel of the plurality of channels in response to the demand, thereby dynamically varying an amount of information provided on the at least one channel in a fixed time; and modifying the bandwidth to bias the communication resource in relation to a relative hierarchy that exists between on-going communications.

Additional aspects of the present invention provide a transmitter, a receiver and a transceiver (according to appended claims 10, 11 and 12, respectively) suitable for use in the communication system of the first aspect of the present invention.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
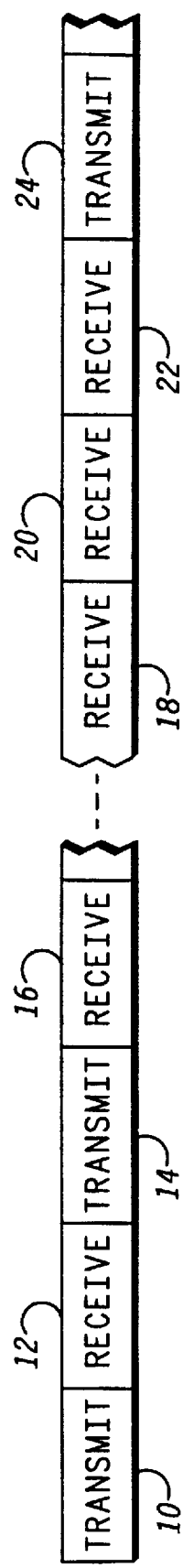
FIG. 1 is a prior art representation of time-slot allocation in a time-domain system.

Referring to FIG. 1, a prior art representation of time-slot allocation in a time-domain system (such as a TDD system having a 50% duty cycle) is illustrated. More specifically, a plurality of contiguous time-slots 10–24 are usually allocated in strict alternating sequence for a transmit function and a receive function, as shown in relation to time-slots 10–16. However, time-slot allocation for forward and reverse channels may periodically require multiple time-slots to be allocated to one direction of communication. In this latter respect, the entire capacity of (three) contiguous time-slots 18–22 has been nominated for a receive function to support additional (increased) communication traffic in a particular direction.

Rather than by adjusting the amount of time in which a terminal (e.g. a communication unit) transmits in the time-domain and/or the amount of energy that the terminal transmits in a given time and/or the modulation level (i.e. the number of bits per symbol) adopted by a variable rate coder during transmission, a communication device (such as a data terminal or a base station) of the present invention additionally or alternatively modifies the bandwidth used for the transmission in proportion with the substantially instantaneous data rate requirements of a service (or services) being supported. As such, the present invention is not restrained to sending a fixed number of bits per second nor is it restrained to a particular modulation rate for the transmission, but is arranged to optimise an available and dynamically varying bandwidth to allow fluctuations in the amount of information transmitted in a fixed time. In this respect, the instantaneous bandwidth can be adjusted in incremental steps (having a potential resolution of 1-bit) between a minimum allowable bandwidth and a maximum allowable bandwidth.

Figure 2:
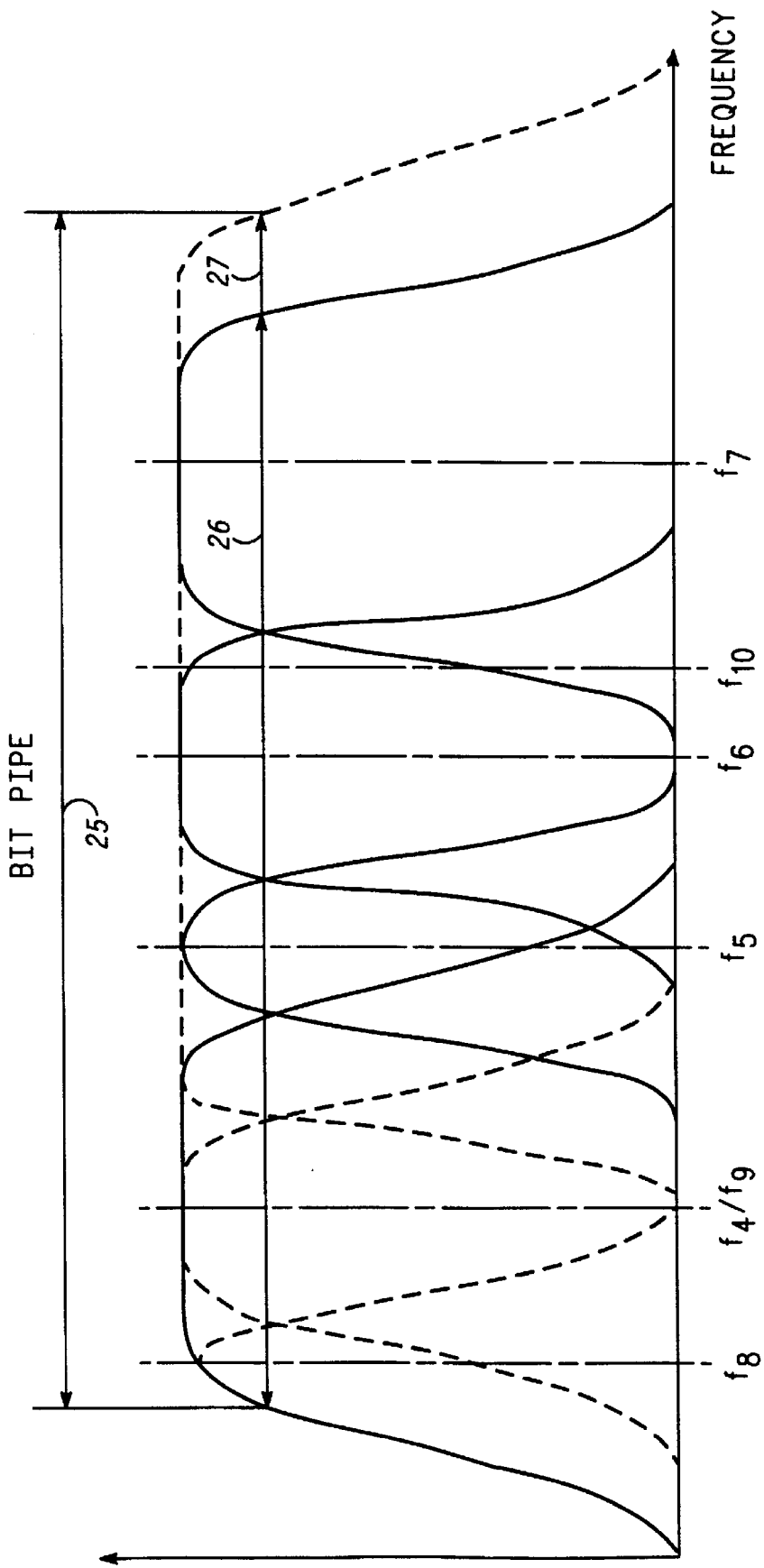
FIG. 2 illustrates dynamic frequency allocation in accordance with a preferred embodiment of the present invention.

The concepts of the present invention are illustrated in FIG. 2 in which an available communication resource (bit pipe) 25 is initially distributed into a plurality of channels of differing bandwidth having central frequencies $f_4$ to $f_7$ for use (in this case) by a corresponding number of remote terminals (not shown), namely four remote terminals in this example. It is noted that, initially, all four terminals are operating at their maximum bandwidth since the available communication resource 25 is not utilised to the fullest extent possible, and only a bandwidth of x Hertz 26 is utilised. Indeed, channels assigned to the four remote terminals occupy a contiguous block of bandwidth within the bit pipe 25. Subsequently, the system is re-configured such that only three remote terminals are served by channels (shown in dotted outline) having central frequencies $f_8$ to $f_{10}$. However, in this instance, there has been an increase 27 in the bandwidth utilised by the system, and that this increase therefore represents full usage of the available bit pipe 25. It will also be noted that, coincidentally, central frequencies $f_4$ and $f_9$ coincide, albeit that central frequency $f_9$ is not now the central frequency for a first channel of the system. Also, as can be seen, the allocation of bandwidth is such that a substantial amount of the available bit pipe 25 has been assigned to the channel having central frequency $f_{10}$.

Figure 3:
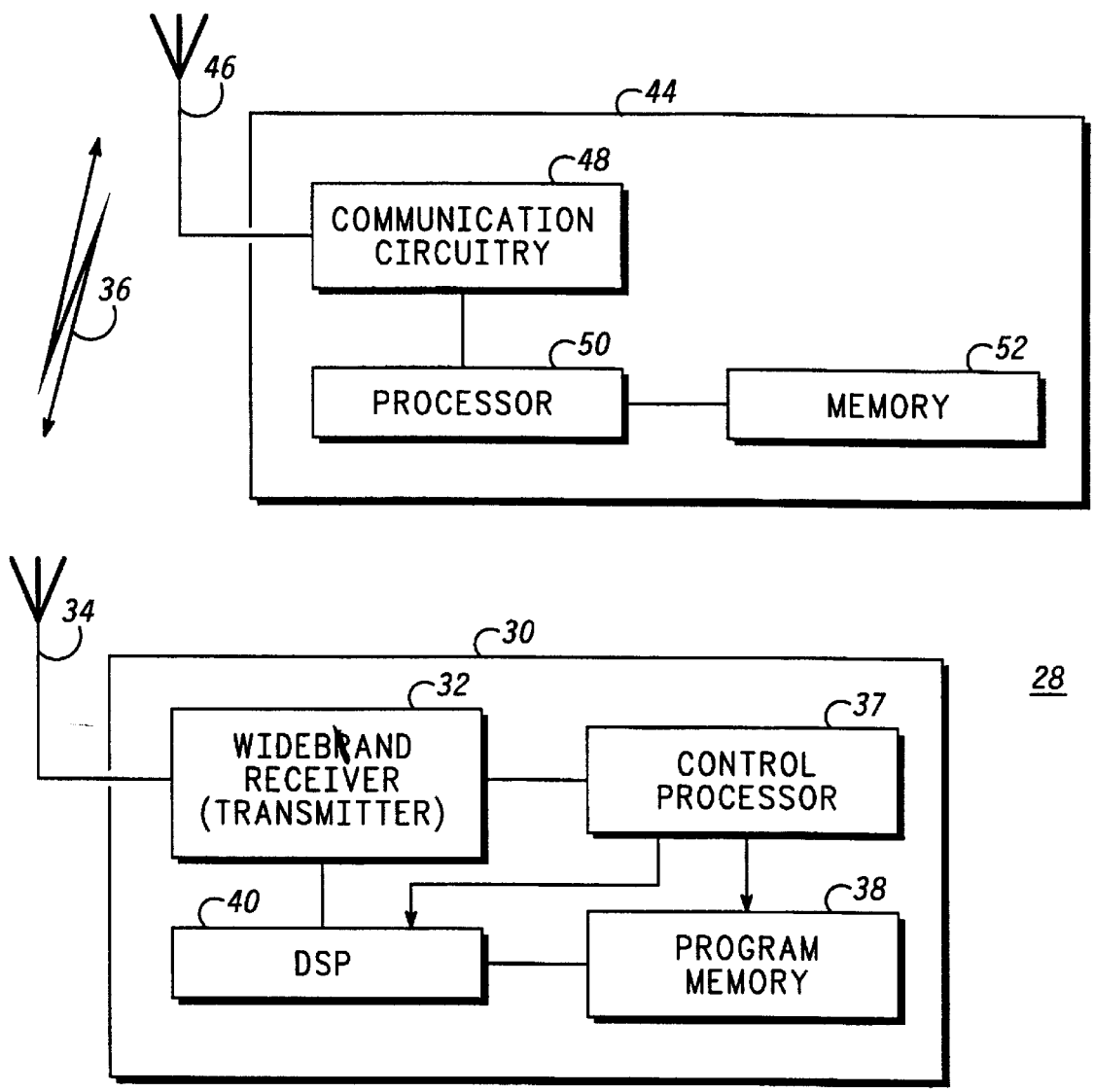
FIG. 3 is a block diagram of a system according to the present invention.

FIG. 3 shows a block diagram of a system 28 incorporating the present invention. A device 30 contains wideband receiver circuitry 32 coupled to an antenna 34 for reception of information signals 36 transmitted from a system control unit 44. The wideband receiver 32 is connected to a control processor 37 arranged to control and orchestrate operation of the receiver, in general. The control processor 37 is additionally coupled to program memory 38 (for storing receiver control routines) and a digital signal processor (DSP) 40, which DSP is also coupled to the wideband receiver 32 and the program memory 38. The system control unit 44 transmits (and receives) information signals 36 at an antenna 46. The antenna 46 is coupled to communication circuitry 48, which in turn is responsive to a processor 50 that maintains system control. The processor 50 is coupled to a memory 52 that retains both control algorithms (including receiver and transmitter control routines) and information relating to preferred and current operating parameters (bandwidths/modulation rates) for devices, such as device 30, served by the system control unit 44. The memory 52 may be located internally or externally with respect to the system control unit 44.

The control routines are principally applicable to the dynamic adaptation of a modulation rate for a device (be it a master device or a slave device), since optimisation of the dynamically varying channel bandwidth is principally dependent upon the selected modulation rate for the device. As such, encoding and decoding algorithms for the device must be periodically retrieved and loaded from memory.

Although the device 30 of FIG. 3 has been described in relation to a receiver, it will be immediately appreciated that the device 30 may be a transmitter or a transceiver and that appropriate substitution or modification of the wideband receiver circuitry and the receiver control routines (to be described subsequently) need only be effected to adapt the device for such other use.

In a particular embodiment of the present invention, dynamic allocation of available bandwidth to remote terminals may be based upon a hierarchy (such as an access priority coupled with a bandwidth demand or a service-orientated hierarchy in which certain services are maintained in preference to other differing services) present within the remote terminals, which hierarchy is stored within the memory 52 of system control unit 44. More specifically, a remote terminal of relatively high priority (such as an emergency line, or a diplomatic video channel) might always be assigned its maximum bandwidth, whereas another remote terminal of relatively low priority is dynamically assigned a varying channel bandwidth based upon system arbitration (performed by the processor 50). A remote terminal of relatively low priority might only be granted a minimal amount for channel allocation (if any) by the system control unit in certain instances, or may have its bandwidth reduced (or suspended) during a communication in order that the system can accommodate a remote terminal of relatively higher priority. Therefore, to support all remote terminals seeking access to the bit pipe 25, each remote terminal may be assigned a fixed or varying proportion of its maximum bandwidth capability, subject to the hierarchy. In relation to any reduction of bandwidth provided to a unit, services of greater importance to that unit (e.g. services essential to the relay of information) are maintained above ancillary services that are complementary to the relay of information, i.e. the bandwidth required to support a voice communication is substantially less than the bandwidth required to support video conferencing while the essential information is predominantly contained within the voice communication. Therefore, the video link would be surrendered by the unit prior to the potential surrender of the voice link.

According to the present invention, the minimum or maximum allowable bandwidth for the system can be either pre-set or determined by negotiation between transmitting and receiving equipment. More particularly, using a scenario of a master device and a slave device communicating via a wireless medium (where the master device may be a base station and the slave device may be a mobile terminal), the negotiation of the minimum or maximum allowable bandwidth can be achieved using the following exemplary mechanism:

Step 1: The slave device informs the master device of its preferred minimum/maximum bandwidth limits via a control message;

Step 2: The master device firstly compares the slave device's preferred limits with the slave device's capability (stored in a data base, i.e. memory 52, accessible to the master unit) and then, secondly, estimates an instantaneous frequency availability for the system in order to obtain an allowable bandwidth at that instant in time; and Step 3: The master device informs the slave device of allowable bandwidth limits via a control message, and stores any change in system configuration in memory 52.

As will be appreciated, step 1 and step 2 are optional. Typically, step 3 will be achieved via a broadcast message or a device specific transmission, or the like. Also, it should be noted that the minimum bandwidth limit for some systems (e.g. CDMA based systems) is non-zero because a minimum number of bits needs to be transmitted on a regular basis to maintain power control within the system, such that a remote unit does not have to re-establish communication with a base station using a random access mechanism, as will be understood.

According to a preferred embodiment of the present invention, the instantaneous bandwidth for transmission from the master device and the slave device is adjustable (throughout a call) by steps within the allowable minimum and maximum limits; although this is ultimately subject to the available bandwidth 25 known by the master device. In this respect, the transmitting device (either master or slave) can inform the receiving device of the exact bandwidth to be used for a following transmission period by sending a unique control (or synchronisation) sequence at some time prior to each transmission of data.

Figure 4:
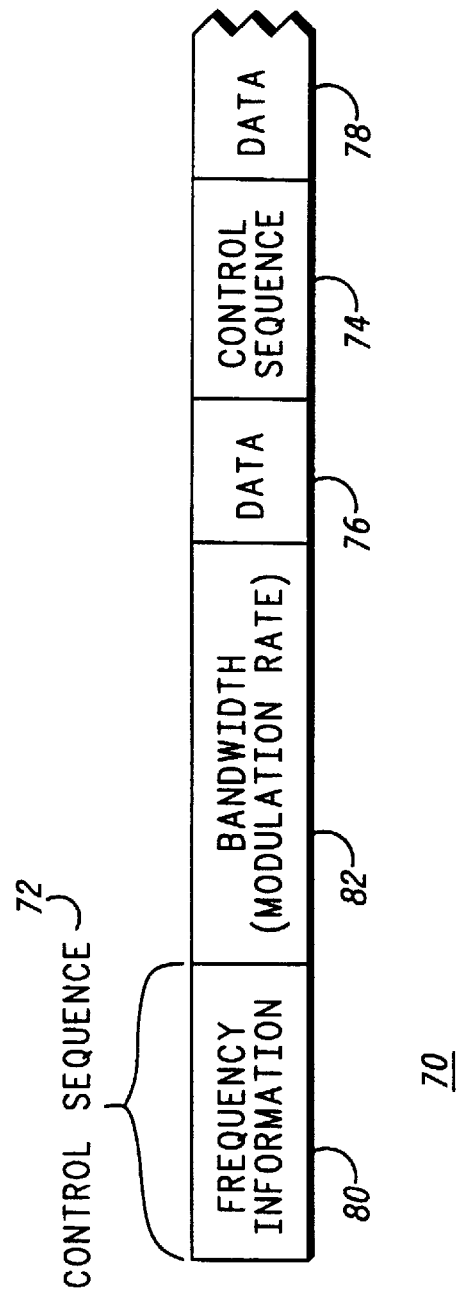
FIG. 4 represents a typical communication protocol for a communication unit of a preferred embodiment of the present invention.

FIG. 4 represents a typical communication protocol 70 for a communication unit of a preferred embodiment of the present invention. The communication protocol 70 contains control sequences 72–74 interspersed with data communication sequences 76–78. Each control sequence 72–74 may contain frequency information 80 identifying a central frequency about which to transmit or receive information and bandwidth (modulation rate) information 82 identifying a dynamically varying bandwidth (or modulation rate) selected for a subsequent reception or transmission of data. As will be understood, the communication protocol 70 need not be continuous and may therefore be packaged into discrete blocks. As such, the control sequences 72–74 may be either transmitted immediately prior to data sequences 76–78, or transmitted separately in time from the data sequences 76–78 (e.g. at the end of a transmission of data in readiness for a subsequent transmission of data).

In the preferred embodiment, in order to gain maximum advantage from adjusting the bandwidth of the transmission, the master device determines the exact location of each centre frequency for each channel and informs the slave device accordingly. Therefore, in an up-link scenario where data is transmitted from the slave device to the master device, a control sequence 72 need not include the frequency information 80. Indeed, control sequences 72–74 (other than synchronisation sequences and address fields (and the like) required for general system control but not specifically shown in FIG. 4 for the sake of clarity) may be omitted in the event that there is no change in the central frequency of the channel and/or the available bandwidth.

Clearly, at any time during a communication (call), the master device can maximise information transfer to the slave device by setting the minimum/maximum limits to correspond to a maximum information rate handling capacity for a particular slave device.

In the case of the transmission of data from a master device, a determination of a centre frequency for a channel is based on the bandwidth currently available to the system 28 having regard to current operating bandwidths and priorities for devices served by the system (i.e. a current utilisation of the bit pipe 25 by the system 28). The master device therefore informs the slave device of the centre frequency and bandwidth to be used using the control message 72–74. Furthermore, specification of the bandwidth by the system control unit 44 (i.e. the master unit) may determine the modulation rate adopted by the remote unit (i.e. the slave device 30) by default, since the slave device is preferably arranged to select an optimum modulation rate for the available bandwidth. Alternatively, the slave device may select to lower modulation rate and inform the master device accordingly.

In the case of a slave device wishing to either transmit or to alter its bandwidth (modulation rate), the slave device usually receives a control sequence from the master device defining the centre frequency and bandwidth (modulation rate) to be used. For example, the master device may inform the slave device of allowable operating parameters in response to the slave device attempting to establish a communication with the master device on a Random Access Channel (RACH). If the slave device selects a lower modulation rate, the master device must be informed (through the transmission of a control sequence) in sufficient time to allow modification of the master device to receive the data encoded at this lower modulation rate.

Using the present invention, a master device can statistically multiplex more users onto an available spectrum than is otherwise possible with a fixed bandwidth scheme. This advantage is achieved by balancing the requirements of each transmission and fitting each transmission into the available spectrum in an optimal manner (while also taking into account acceptable co-channel interference levels and, perhaps, the re-use of suitable channel carriers based on a relative position between a master device and a plurality of slave devices). The present invention has the advantage that it is sufficiently flexible to accommodate dynamic adjustments in the total available spectrum.

The present invention has the additional advantage that it is not constrained by fixed frequency re-use plans which are prevalent in many of today's cellular networks. In fact, the present invention is highly adaptive and allows easy introduction of new base stations.

Figure 5:
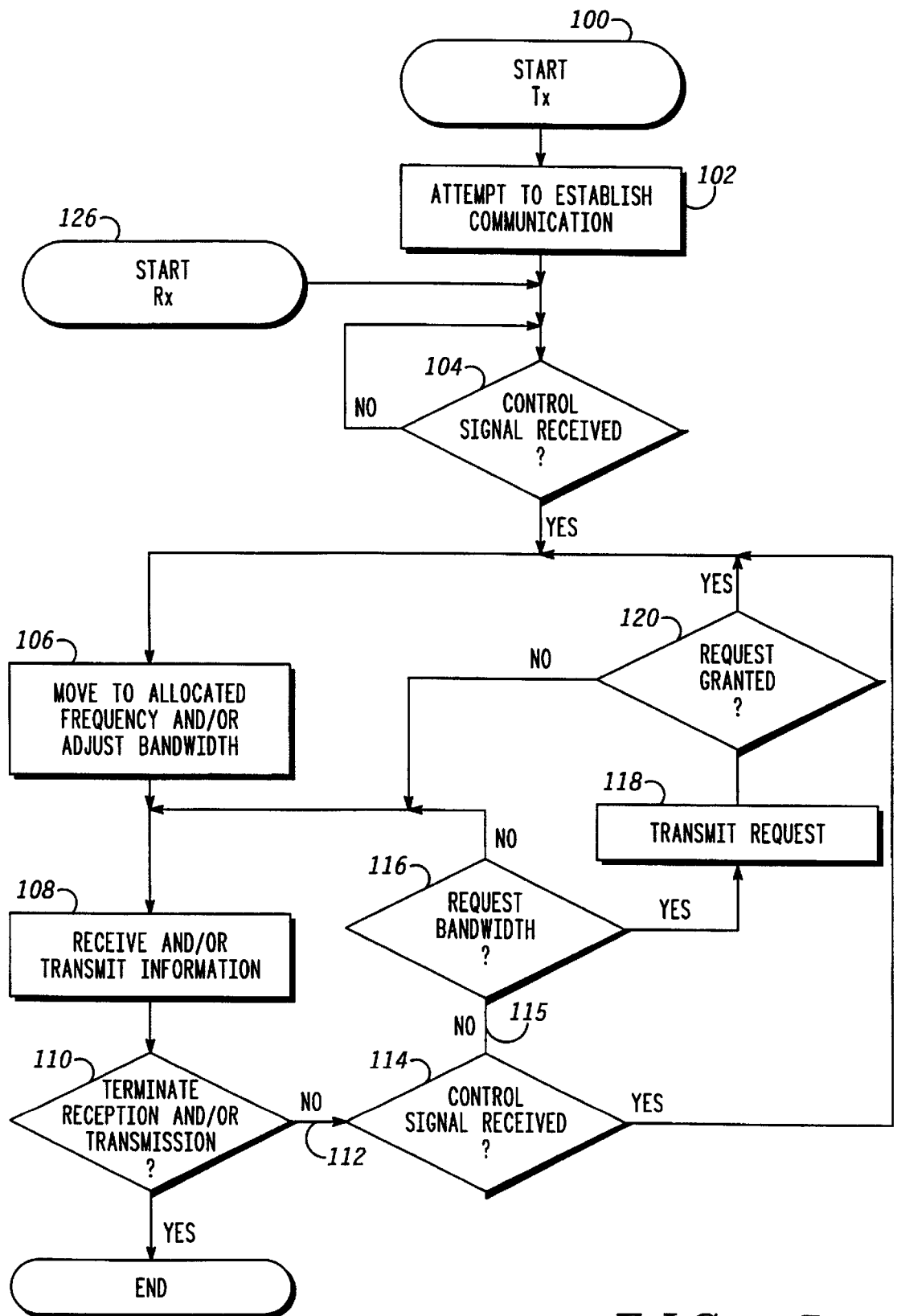
FIG. 5 is a flow diagram (in accordance with a preferred embodiment of the present invention) showing typical operation of a communication unit.

Considering now the preferred operation of the present invention (as shown in FIG. 5) in the context of a slave transceiver, a transmission sequence originating at the slave transceiver begins at block 100. The slave transceiver attempts 102 to establish a communication link with the master device on a RACH (or the like) and then waits 104 to receive a control signal from the master device. In response to the control signal, the control processor 37 of the slave transceiver extracts bandwidth and centre frequency information and instructs its DSP 40 to adjust 106 the operating parameters and processing algorithms of the slave transceiver accordingly. The DSP 40 then proceeds to transmit 108 appropriately modulated information from the wideband transmitter for a time period, such as a TDM time-slot. Subsequently, a determination is made 110 to ascertain whether transmission is to continue. If transmission ceases, the process ends 112, whereas if transmission is to continue the slave transceiver typically waits 114 to see whether a new control signal has been received from the master device. In the affirmative, reception of subsequent information is preceded by the adjustment of the operating parameters and processing algorithms at block 106. In the negative 115, the slave transceiver may wish 116 request additional bandwidth to support additional services. In the negative, the slave transceiver proceeds to transmit at block 108 (as previously described). However, if the slave transceiver wishes to request additional bandwidth then the slave transceiver must first transmit 118 a request and then await 120 grant/denial of the request (through receipt of a control signal or after a time-out) before either re-configuring its operating parameters and processing algorithms at block 106 or continuing to transmit at the earlier designated modulation rate and frequency (block 108).

In a receive context, reception of information begins with the identification (addressing) 126 of the slave transceiver and then proceeds to block 104 receipt of a control signal from the master device is awaited. Thereafter, the DSP 40 is configured 106, 108 to extract the correct information from a wideband signal received by the wideband receiver 32.

Typically, the request to increase bandwidth and the receipt of control messages are administered on a dedicated control channel.

It will be understood that the present invention may be applied to simplex and full- and half-duplex communication protocols.

Therefore, unlike operation of prior art communication systems (such as the TDD system of FIG. 1) which maintain a constant instantaneous radio channel bandwidth for all data rates supported by the system, the present invention dynamically varies the bandwidth (and hence the rate of modulation) used for information transfer in response to a demand on the communication resource (bit pipe) of the system.

It will, of course, be appreciated that the above description has been given by way of example only and that modification in detail, such as the use fibre-optic communication links, may be made within the scope of the present invention.

What is claimed is:

1. A communication system having a communication resource for supporting communications on a plurality of channels having channel bandwidths in a radio frequency (RF) domain, the plurality of channels capable of supporting a plurality of differing services, the system comprising:

means for determining a demand on the communication resource;

means for dynamically modifying a bandwidth in the RF domain of at least one channel of the plurality of channels in response to the demand, said means for dynamically modifying being arranged to modify the bandwidth to bias the communication resource with respect to a relative hierarchy that exists between ongoing communications; and means for storing hierarchy information defining a relative hierarchy within communication devices of the communication system, and wherein the means for dynamically modifying the bandwidth modifies the bandwidth of at least one channel to bias the communication resource to support an operating capability of a first communication device having a hierarchy relatively high to that of a second communication device having a relatively lower hierarchy in the communication system;

wherein a bandwidth allocated to the second communication device is reduced, and further wherein services of greater importance in relaying information to the second communication device are maintained above ancillary services that are complementary to the relaying of such information.

2. The communication system of claim 1, wherein a bandwidth allocated to the second communication device is suspended.

3. The communication system of claim 1, wherein the hierarchy is based on access priority.

4. The communication system of claim 1, wherein the relative hierarchy exists between differing services supported by the communication system.

5. The communication system of claim 1, wherein the means for dynamically modifying the bandwidth modifies the bandwidth of at least one channel in proportion to a substantially instantaneous data rate requirement of a communication on that channel.

6. The communication system of claim 1, wherein the means for dynamically modifying the bandwidth further comprises means for assigning a central channel frequency for the at least one channel of the plurality of channels.

7. The communication system of claim 6, wherein the means for assigning central channel frequencies is arranged such that the plurality of channels occupy a contiguous block of bandwidth within the communication resource.

8. The communication system of claim 1, further comprising memory for storing operating parameter information related to operational parameters of communication devices of the communication system, and wherein the means for dynamically modifying the bandwidth modifies the bandwidth of at least one channel to optimise the amount of information provided on the at least one channel in a fixed time having regard to the operating parameter information.

9. The communication system of claim 1, further comprising memory for storing operating parameter information related to operational parameters of communication devices of the system, and wherein the means for dynamically modifying the bandwidth is arranged to ensure that a minimum bandwidth is provided to communication devices active on the communication resource at any time.

10. A method for distributing a communication resource of a communication system into a plurality of channels, the method comprising the steps of:

determining a demand on the communication resource;

dynamically modifying a bandwidth in a radio frequency domain of at least one channel of the plurality of channels in response to the demand, thereby dynamically varying an amount of information provided on the at least one channel in a fixed time;

modifying the bandwidth to bias the communication resource in relation to a relative hierarchy that exists between on-going communications;

storing hierarchy information defining a relative hierarchy within communication devices of the communication system;

biasing the communication resource to support an operating capability of a first communication device having a hierarchy relatively high to that of a second communication device having a relatively lower hierarchy in the communication system; and maintaining services of greater importance in relaying information to the second communication device above ancillary services that are complementary to the relaying of such information, wherein a bandwidth allocated to the second communication device is reduced.

11. A communication system having a communication resource for supporting communications on a plurality of channels having channel bandwidths in a radio frequency (RF) domain, the plurality of channels capable of supporting a plurality of differing services, the system comprising:

means for determining a demand on the communication resource;

means for dynamically modifying a bandwidth in the RF domain of at least one channel of the plurality of channels in response to the demand, said means for dynamically modifying being arranged to modify the bandwidth to bias the communication resource with respect to a relative hierarchy that exists between ongoing communications, wherein the means for dynamically modifying the bandwidth further comprises means for assigning a central channel frequency for the at least one channel of the plurality of channels; and means for storing hierarchy information defining a relative hierarchy within communication devices of the communication system, and wherein the means for dynamically modifying the bandwidth modifies the bandwidth of at least one channel to bias the communication resource to support an operating capability of a first communication device having a hierarchy relatively high to that of a second communication device having a relatively lower hierarchy in the communication system, wherein a bandwidth allocated to the second communication device is reduced.

12. The communication system of claim 11, wherein the means for dynamically modifying the bandwidth modifies the bandwidth of at least one channel in proportion to a substantially instantaneous data rate requirement of a communication on that channel.

13. The communication system of claim 11, wherein the means for assigning central channel frequencies is arranged such that the plurality of channels occupy a contiguous block of bandwidth within the communication resource.

14. The communication system of claim 11, further comprising memory for storing operating parameter information related to operational parameters of communication devices of the communication system, and wherein the means for dynamically modifying the bandwidth modifies the bandwidth of at least one channel to optimise the amount of information provided on the at least one channel in a fixed time having regard to the operating parameter information.

15. The communication system of claim 11, further comprising memory for storing operating parameter information related to operational parameters of communication devices of the system, and wherein the means for dynamically modifying the bandwidth is arranged to ensure that a minimum bandwidth is provided to communication devices active on the communication resource at any time.

16. A method for distributing a communication resource of a communication system into a plurality of channels, the method comprising the steps of:

determining a demand on the communication resource;

dynamically modifying a bandwidth in a radio frequency domain of at least one channel of the plurality of channels in response to the demand, thereby dynamically varying an amount of information provided on the at least one channel in a fixed time, wherein the step of dynamically modifying includes the step of assigning a central channel frequency for the at least one channel of the plurality of channels;

modifying the bandwidth to bias the communication resource in relation to a relative hierarchy that exists between on-going communications;

storing hierarchy information defining a relative hierarchy within communication devices of the communication system; and biasing the communication resource to support an operating capability of a first communication device having a hierarchy relatively high to that of a second communication device having a relatively lower hierarchy in the communication system, wherein a bandwidth allocated to the second communication device is reduced.

* * * * *